(12) United States Patent
Sacquitne

(10) Patent No.: US 6,843,719 B1
(45) Date of Patent: Jan. 18, 2005

(54) FLOATING COMBINE SIEVE ASSEMBLY

(76) Inventor: David Sacquitne, 3490 N. Winn Rd., Decorah, Winneshiek County, IA (US) 52101

(*) Notice: Subject to any disclaimer, the term of this patent is extended or adjusted under 35 U.S.C. 154(b) by 0 days.

(21) Appl. No.: 10/605,846

(22) Filed: Oct. 30, 2003

(51) Int. Cl.[7] .................................................. A01F 12/32
(52) U.S. Cl. ............................................. 460/101; 460/9
(58) Field of Search ................................. 460/101, 102, 460/8–10

(56) References Cited

U.S. PATENT DOCUMENTS

| | | | | |
|---|---|---|---|---|
| 744,696 A | * | 11/1903 | Silvis | ..................... 460/86 |
| 1,200,002 A | * | 10/1916 | McGraw | ..................... 460/9 |
| 2,250,383 A | * | 1/1941 | Koester | ..................... 209/22 |
| 2,310,610 A | | 2/1943 | Bissell | |
| 2,500,448 A | * | 3/1950 | Bozarth | ..................... 209/416 |
| 3,497,229 A | | 2/1970 | Sietmann et al. | |
| 3,581,746 A | | 6/1971 | Louks | |
| 3,757,797 A | * | 9/1973 | Mathews | ..................... 460/91 |
| 4,177,628 A | | 12/1979 | Brandt | |
| 4,535,788 A | * | 8/1985 | Rowland-Hill et al. | ......... 460/9 |
| 4,557,276 A | | 12/1985 | Hyman et al. | |
| 4,897,071 A | | 1/1990 | Desnijder et al. | |
| 4,968,284 A | | 11/1990 | Klimmer et al. | |
| 5,041,059 A | * | 8/1991 | Ricketts et al. | ............. 460/101 |
| 5,282,771 A | | 2/1994 | Underwood | |
| 5,338,257 A | | 8/1994 | Underwood | |
| 6,053,812 A | | 4/2000 | Loewen et al. | |

* cited by examiner

Primary Examiner—Meredith Petravick
(74) Attorney, Agent, or Firm—Ryan N. Carter

(57) ABSTRACT

A sieve assembly for separating grain from chaff inside of a combine. The sieve assembly comprises a plurality of longitudinal sieve planks that pivot on their longitudinal axis. A hanging weighted member combined with the sieve planks regulates the angle of the sieve planks relative to the combine. As the combine becomes laterally inclined on a hillside, the weighted member changes its angular position relative to the combine. In doing so, the weighted member causes the sieve planks to pivot on their longitudinal axis so that the sieve planks remain level relative to the horizon. Dividers extend between each sieve plank.

1 Claim, 4 Drawing Sheets

FLOATING COMBINE SIEVE ASSEMBLY

BACKGROUND OF INVENTION

The present invention relates generally to combine harvesters and, more particularly, to improvements in their cleaning apparatus to permit a leveling thereof under side hill conditions.

Combines of the type concerned herein are large, self-propelled vehicles for cutting and threshing grain. A combine has a header which has a blade that will cut the crop. An auger mounted to the header delivers the crop up into a threshing chamber. The threshed grain falls onto a set of upper and lower sieves. The sieves separate the grain from the chaff, with the grain falling through the holes in the sieve into a collection area. Air is blown upward through the sieve holes so that the chaff is blown from the combine.

A combine works best while it is level. The grain is evenly distributed across the sieves while the sieves are level. However, a large percentage of the tillable acreage in the United States has hillside grades and terraces. Often it is necessary to cut the hillsides and terraces in back and forth sweeps, with the combine leaning laterally. When the combine leans, grain piles up on the downhill portions of the sieve and thus the grain is distributed onto the sieves unequally. This reduces the effectiveness of the separation between the chaff and the threshed grain. This uneven distribution of the grain on the sieves forces farmers to slow down so that the grain does not build up on the downhill side of the combine to the point where grain is lost from the combine.

Attempts to maintain combine sieves in a horizontal orientation while the combine is operating under side hill conditions can be found in several prior art patents. One such patent is U.S. Pat. No. 3,731,470. The apparatus disclosed in this patent provides a leveling of the entire frame of the combine through the operation of hydraulic cylinders to maintain the cleaning apparatus in a generally horizontal orientation. Since the entire combine is maintained in a level orientation, this patent teaches the modification of the connection of the crop harvesting header to the combine to permit a proper gathering of the crop material to be harvested. However, this mechanism is complicated and expensive to manufacture as well and cumbersome in operation.

Another prior art device that comprises a leveling sieve apparatus is described in U.S. Pat. No. 5,282,771. This patent discloses a plurality of sieve sections that pivot on their longitudinal axis so that their top surface always remains level relative to the horizon. The sieve sections are pivoted by an electronic motor that senses the lateral inclination of the combine through an electronic sensing means called an inclinometer. The problem with the device described in this patent is that the electronic sensing means and the electric motors that pivot the sieve sections are expensive to install and to operate. Furthermore, there is usually a lag time between the inclinometer sensing the lateral inclination of the combine, and the actual pivoting of the sieve sections. This lag time can lead to inefficient separating of grain.

Yet another prior art device that discloses efficient grain separation in a combine is described in U.S. Pat. No. 2,310,610. This patent teaches a method wherein a moveable deflector plate is combined with a pendulum to direct falling grain away from the downhill side of the combine's sieves. Although this device may direct falling grain to the uphill side of the sieves, the device is inefficient because once the grain falls onto the sieves, gravity will pull it to the downhill side of the combine, resulting in grain buildup on the downhill side.

U.S. Pat. Nos. 2,893,558 and 3,108,064 each describe a device which employs a screw-type auger traversing the sieve plate. When grain accumulates at the downhill side of the sieve, the screw-type auger pushes the accumulated grain toward the center of the sieve. The problem with these devices is that the collected grain is directed toward the center of the sieve rather than toward the high edge of the sieve, and therefore these devices only take advantage of half of the sieve's surface area.

Therefore there is a need for a leveling sieve mechanism that is cost effective and efficient in that it uses the entire surface area of the sieve to separate the grain.

SUMMARY OF INVENTION

The present invention provides a leveling mechanism for the sieve assembly of a combine. The leveling mechanism divides the sieve assembly into a number of separate longitudinal sections called planks. Each plank extends the length of the sieve. Each plank individually mounts to the sieve frame by a pivot pin. The pivot pin enables each plank to pivot about a pivot axis that is parallel to the longitudinal axis of the combine.

Each plank has a means for connecting to a weighted member called a pendulum. The pendulum is pivotally attached to the combine so that it is capable of moving laterally relative to the combine. As the combine becomes laterally inclined on a hill, the pendulum pivots laterally on its pivot axis because of gravity. The pivoting of the pendulum turns a linkage bar that is combined with a means for pivoting the planks. The planks pivot to the same degree as the pendulum so that the top surface of the planks remains level relative to the horizon, not relative to the combine frame. While the combine is leaning, the plane of each sieve plank will be vertically spaced from the planes of the other sieve planks. This creates a stair-step configuration. The pendulum is an efficient method of regulating the pivot of the sieve planks because there is no lag time between the changing of the angle of the pendulum and the pivoting of the sieve planks. This ensures that the planks are always level relative to the horizon which maximizes the sieve's surface area and thus maximizes separation efficiency.

It should be noted that in this specification the movement of the pendulum and the pivoting of the sieve planks are movements that are relative to the position of the combine frame. These movements are relative because it is actually the combine that moves from a level position to a laterally inclined position and the pendulum and planks that remain stationary in their plane.

It is important that as the planks pivot, undesired material such as chaff does not fall between the planks and become mixed with the separated grain below. To prevent this, longitudinal dividers extend the length of the sieve frame between the planks. Elastomeric strips are wrapped over the dividers and connect the adjacent sieve planks. The elastomeric strips allow the planks pivot freely while preventing chaff from falling between the planks.

The leveling mechanism of the present invention prevents grain from being pulled toward the downhill side of the sieve assembly, which in turn increases efficiency by employing the entire surface area of the sieve. Because of the increased separation efficiency, the farmer will not have to slow down when using the combine on a hill.

DETAILED DESCRIPTION

Figure 1:
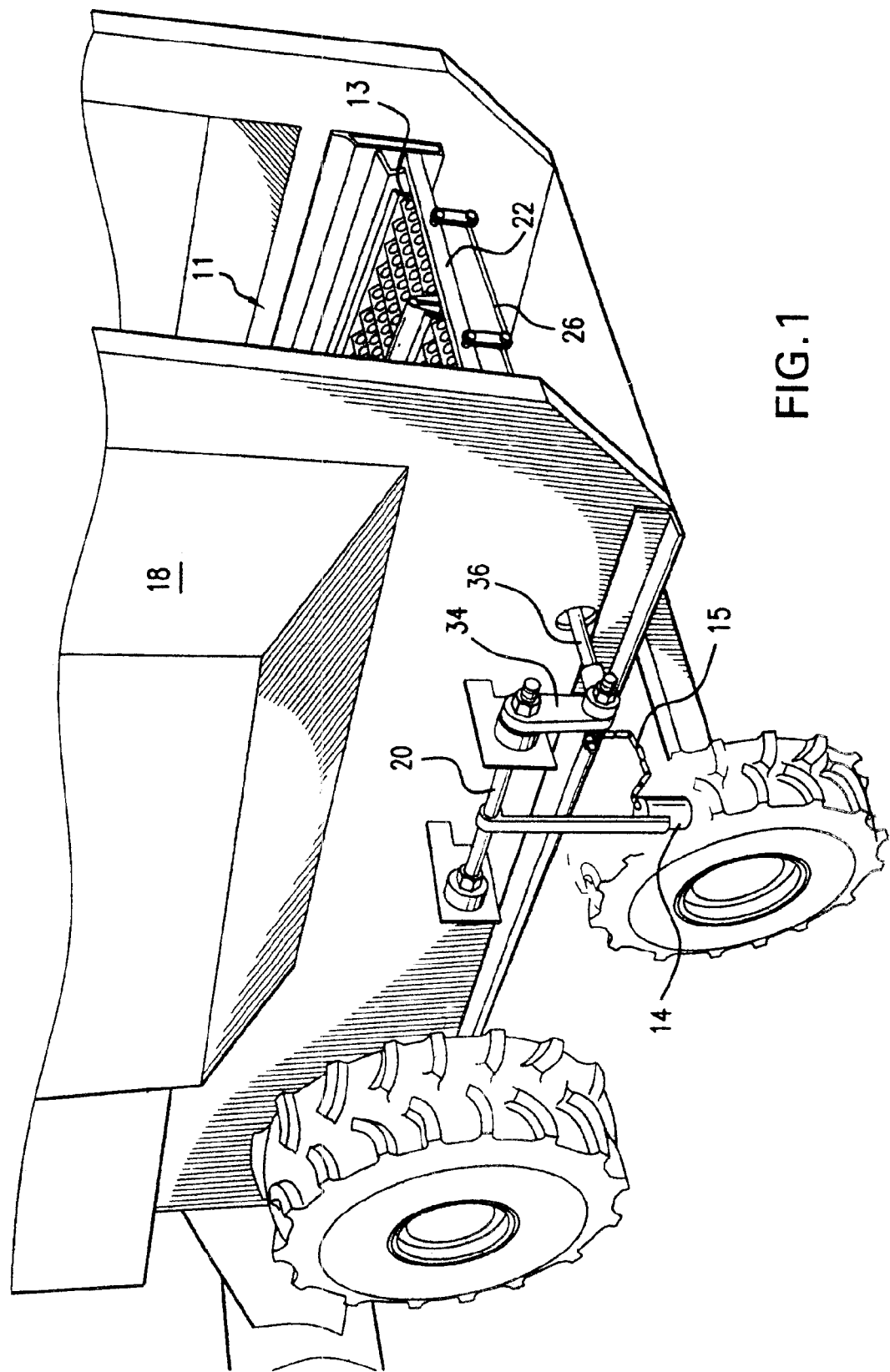
FIG. 1 is a perspective view illustrating a combine having a sieve and a pendulum constructed in accordance with this invention.

FIG. 1 shows a combine 18 having a leveling mechanism for a sieve assembly 11 as herein described. In a combine's basic operation, the combine 18 cuts the crop, threshes the crop, and then delivers the threshed crop onto a sieve 11 for separating the grain from the chaff. This sieve 11 separation is a gravity separation in which the desired grain particles are smaller than the chaff. The sieve 11 has a top surface with a plurality of oblong holes 13 which are large enough to allow threshed grain to fall through, yet not large enough to allow chaff to fall through. The oblong shape of the holes 13 allows the grain to efficiently fall through the sieve 11 by preventing the grain from gathering on top of the sieve 11. The oblong holes 13 are angled toward the back of the combine so that as air is blown upward through the holes 13, the chaff is directed to the back and eventually out of the combine 18. These angled holes 13 allow for efficient cleaning of the grain because the chaff is blown out of the combine 18 more quickly and thus the chaff does not interfere with the grain falling through the sieve 11.

Figure 2:
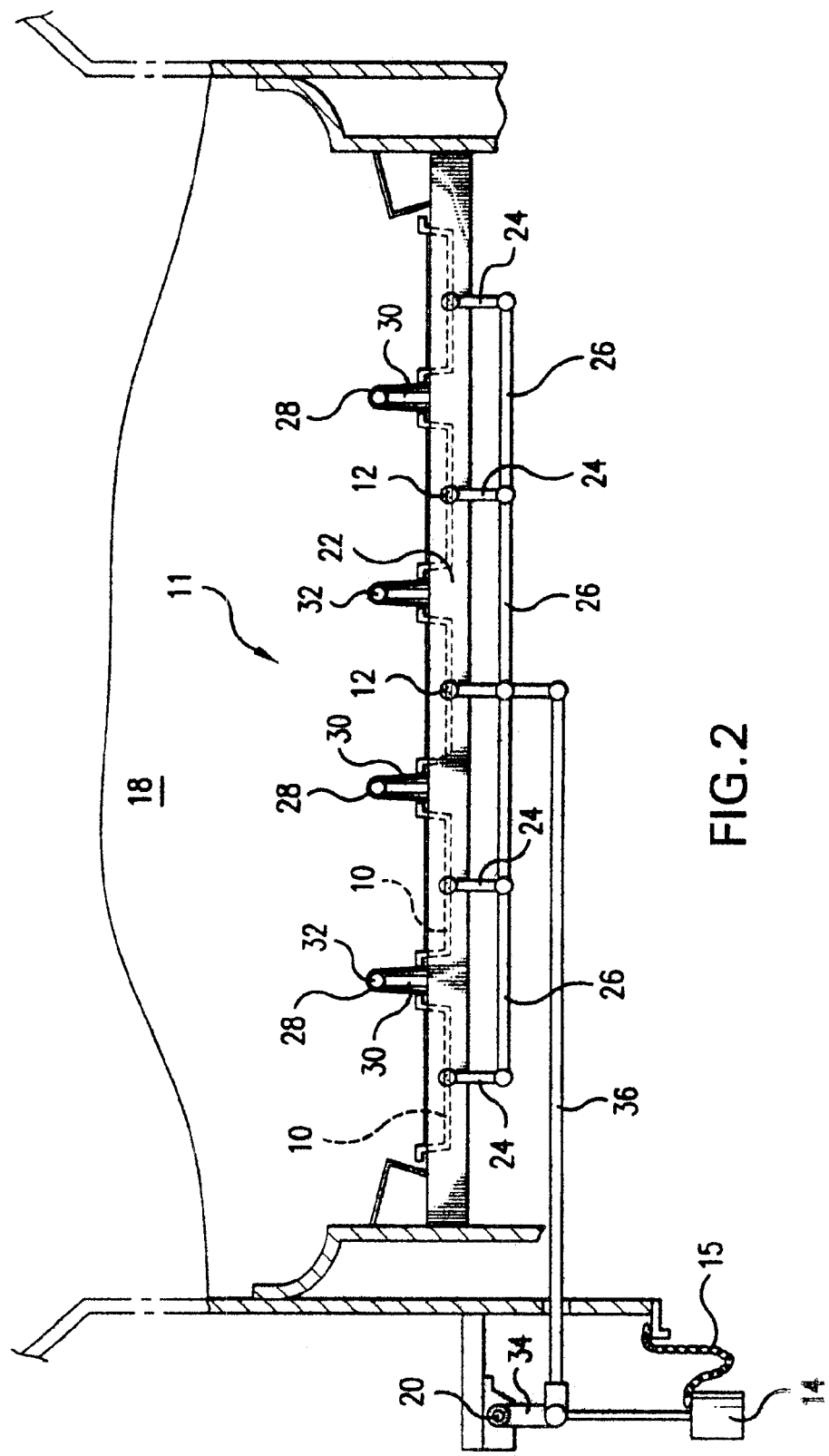
FIG. 2 is a rear view of the sieve while the combine is level in a lateral direction.
Figure 3:
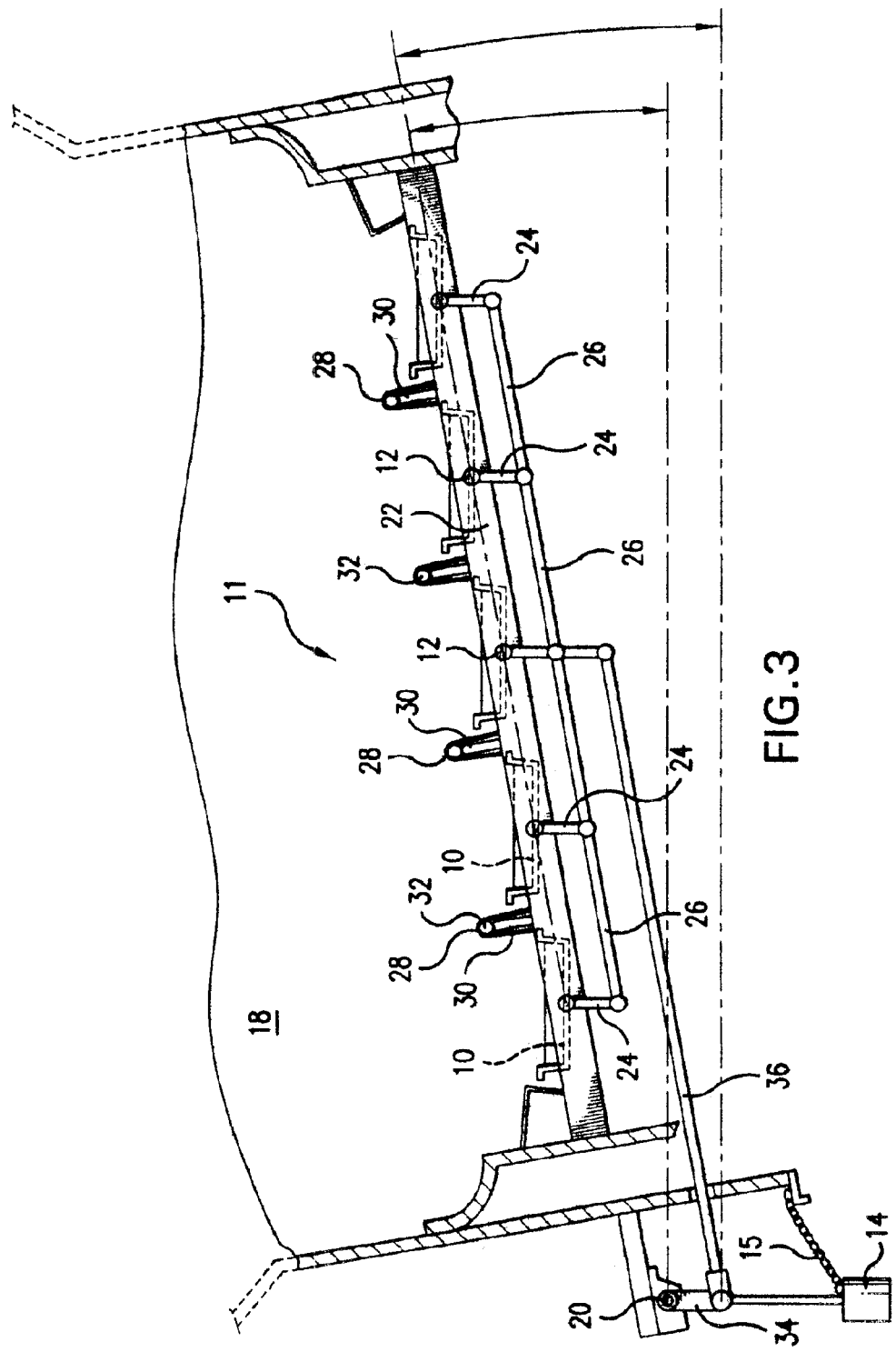
FIG. 3 is a rear view of the sieve while the combine is leaning in a lateral direction.
Figure 4:
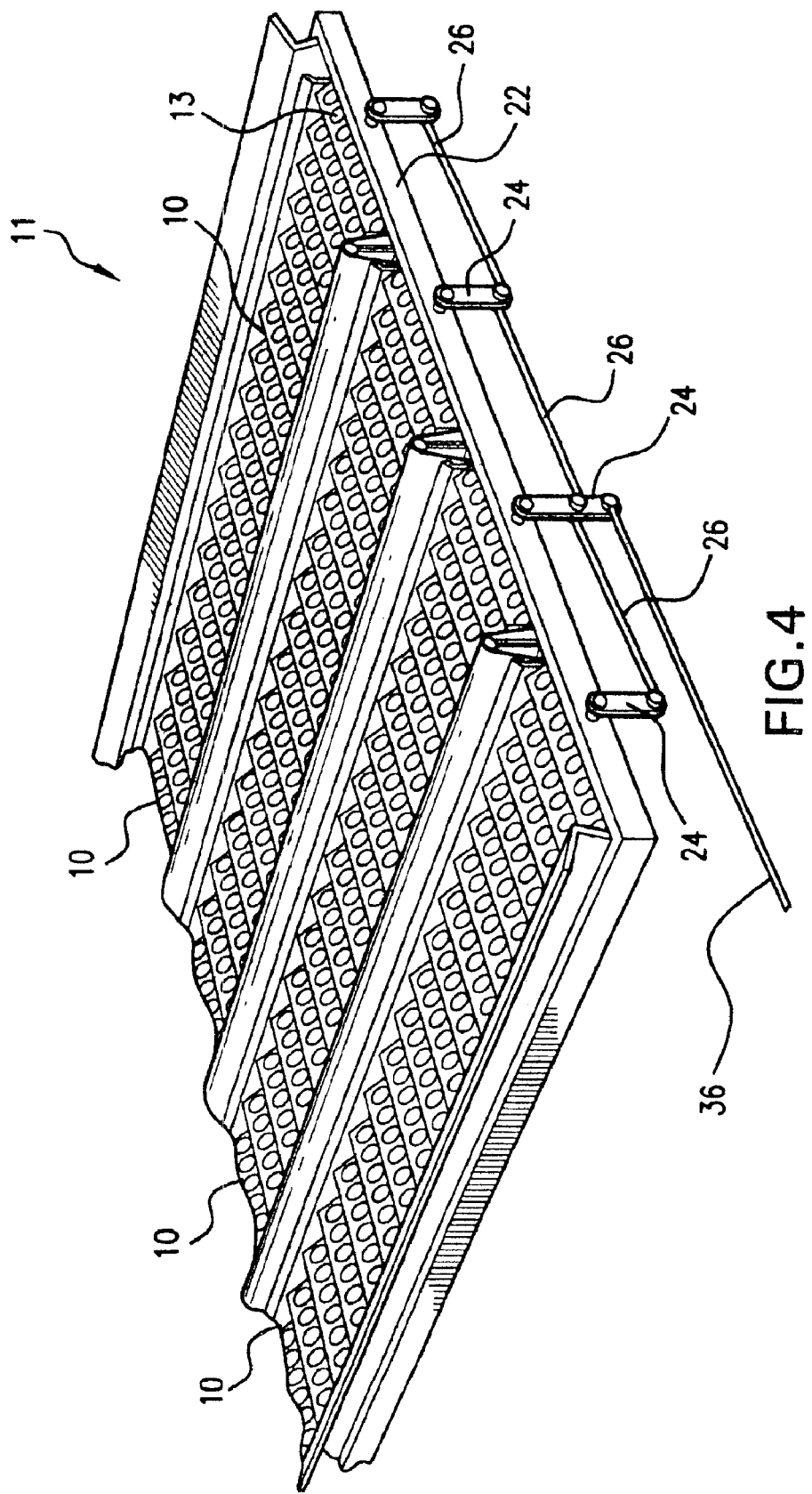
FIG. 4 is a perspective view of the sieve assembly showing the rods and levers that connect the pendulum with the sieve planks.

FIGS. 2, 3, and 4 show the sieve assembly 11 of the present invention. In the preferred embodiment only the upper sieve has a leveling mechanism; however, if the combine also has a lower sieve assembly, the lower sieve could also have a similar leveling mechanism. The sieve assembly frame 22 is securely mounted onto the combine 18 frame, and thus does not pivot relative to the combine 18. This is seen in FIG. 3 wherein as the combine 18 leans laterally to one side, the sieve frame 22 will also lean to the same degree. A plurality of sieve planks 10 are combined with the sieve assembly frame 22. In the preferred embodiment, four planks 10 are used in a small combine 18, while five planks 10 are used in a large combine 18. The sieve planks 10 are individually pivotally mounted onto the stationary rectangular sieve frame 22 by a pivot pin 12 at each end so as to provide a pivoting longitudinal axis. In the preferred embodiment, each sieve plank 10 can pivot laterally on its longitudinal axis about twenty degrees in each direction. Each sieve plank 10 is rectangular and extends the length of the sieve frame 22.

As shown in FIGS. 1, 2, and 3, the pivot of the sieve planks 10 relative to the combine 18 is regulated by a weighted member called a pendulum 14. The pendulum 14 is attached to the combine 18 at a distance far enough away from the combine 18 frame so that it can freely pivot in both lateral directions. As seen in FIG. 3, when the combine 18 is laterally inclined, the planks 10 remain level relative to the horizon. This leveling of the sieve planks 10 is achieved by the movement of the pendulum 14, which in turn moves a series of levers and rods, which pivot the sieve planks 10. The preferred combination of levers and rods is described in the following paragraph, however, variations in these mechanics are meant to be included within the scope of this invention.

As best seen in FIG. 1, the pendulum 14 is secured to, and hangs from a linkage bar 20. The linkage bar 20 is pivotally attached with the combine 18 frame so that the linkage bar 20 pivots as the pendulum 14 moves laterally. The movement of the pendulum 14 is caused by the force of gravity as the combine 18 becomes laterally inclined. The turning of the linkage bar 20 moves a linkage lever 34 located at one end of the linkage bar 20. The linkage lever 34 is combined with the linkage bar 20 at its first end, and a linkage rod 36 at its second end. The movement of the linkage lever 34 pushes (or pulls) linkage rod 36. Linkage rod 36 is combined with bar 26 and thus causes bar 26 to move as the linkage rod 36 is pushed or pulled. Bar 26 is combined with levers 24 which are each combined with, and pivotally move the sieve planks 10. Levers 24 are preferably combined with the planks 10 at their pivot pin 12.

As described in the previous paragraph, the pendulum's 14 movement of these rods and levers pivots the planks 10 so that the top surface of each plank 10 remains perpendicular to the force of gravity as the combine 18 becomes laterally inclined. This is seen by comparing FIG. 2 with FIG. 3. In FIG. 2 the combine 18 and the sieve assembly 11 are shown in a level position, while in FIG. 3 the combine 18 is laterally inclined as shown by the arrows, yet the sieve planks 10 remain level. All of the planks 10 are combined with each other through their levers 24 and bar 26 which allows the planks 10 to pivot in unison with the movement of the pendulum 14. The movement of the planks 10 ensures that the maximum surface area of the sieve 11 is being employed no matter what the angle of lateral inclination of the combine 18. Sieve 11 efficiency will be maximized since harvested grain and chaff will not be pulled toward the downhill side of the combine 18. In the preferred embodiment, the pendulum 14 weighs between thirty and fifty pounds, depending on the weight needed to pivot the planks 10 which changes depending on the number of planks 10 used on the particular assembly.

As seen in FIGS. 1, 2 and 3, a leash 15 such as a chain connects the pendulum 14 to the combine 18 frame. The length of the leash 15 can be changed to regulate the degree the planks 10 are allowed to pivot. This regulation function can be seen in FIG. 3 wherein the leash 15 is taut and will not allow the pendulum 14 further movement in one direction. The leash 15 also protects the leveling sieve device by ensuring that the pendulum 14 does not move an excessive distance which could bend or break any of the components of the invention. For example, if the pendulum 14 were to become caught on a stationary object such as a fence post or tree root as the combine 18 was in motion, the pendulum 14 could be pulled an excessive distance and damage the leveling device's components. The leash 15 prevents this damage from occurring by providing a maximum distance the pendulum 14 is allowed to travel.

It is important that as the planks 10 pivot, undesired material such as chaff does not fall between the planks 10 and contaminate the separated grain below. Referring now to FIGS. 2 and 3, longitudinal dividers 30 extend between each sieve plank 10. In the preferred embodiment, each divider 30 comprises a strip of steel with a cylindrical tube 32 on top extending the length of the divider 30. A seal 28 made of a flexible elastomeric material such as plastic, cloth, or vinyl wraps over the cylindrical tube 32 and connects the adjacent planks 10 to cover the gap between the sieve planks 10. The dividers 30 and seal 28 are located between each plank 10, and also between the outer sieve planks 10 and the frame 22. The dividers 30 and flexible seal 28 allow each plank 10 to freely pivot on their pivot axis without creating a gap between the planks 10. The dividers 30 extend the length of the sieve frame 22 and are combined with the sieve frame 22 so that they do not pivot along with the planks 10. The elevated position of the dividers 30 relative to the sieve 11 also helps to direct the grain into the sieve holes 13.

Having thus described the invention in connection with the preferred embodiments thereof, it will be evident to those skilled in the art that various revisions can be made to the preferred embodiments described herein with out departing from the sprit and scope of the invention. It is my intention, however, that all such revisions and modifications that are evident to those skilled in the art will be including with in the scope of the following claims.

What is claimed is:

1. A sieve for separating grain from chaff in a combine harvester, said sieve comprising:

a frame adapted for attachment to the combine harvester, said frame having a front end and a rear end;

a plurality of longitudinal planks each pivotally combined with the frame between the front end and the rear end so as to pivot about their longitudinal axis, said planks having a top side and a bottom side;

a plurality of sieve holes extending through the planks for separating grain from chaff;

a pendulum adapted to be combined with the combine harvester and operatively engaged with the planks, said pendulum for pivoting the planks on their longitudinal pivot axes as the pendulum changes angular position relative to the combine and the frame;

a plurality of longitudinal dividers combined with the frame and located between the planks, said dividers being positioned so as to prevent chaff from falling between the planks;

wherein the dividers have a rectangular portion extending upward away from the sieve frame and a cylindrical portion on top of the rectangular portion; and a seal extending over the cylindrical portion connected to adjacent planks so as to prevent chaff from falling between the planks as the planks pivot.

\* \* \* \* \*